US012775118B2

(12) United States Patent
Syresin et al.

(10) Patent No.: US 12,775,118 B2
(45) Date of Patent: Oct. 27, 2026

(54) FAST APPROACH FOR DISPERSION CURVE STACKING, VISUALIZATION AND CALIBRATION

(71) Applicant: Schlumberger Technology Corporation, Sugar Land, TX (US)

(72) Inventors: Denis Syresin, Sugar Land, TX (US); Sandip Bose, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 356 days.

(21) Appl. No.: 18/600,202

(22) Filed: Mar. 8, 2024

(65) Prior Publication Data

US 2025/0284023 A1 Sep. 11, 2025

(51) Int. Cl.
*G01V 3/38* (2006.01)
*G01V 3/34* (2006.01)
*G01V 13/00* (2006.01)

(52) U.S. Cl.
CPC .................. *G01V 3/38* (2013.01); *G01V 3/34* (2013.01); *G01V 13/00* (2013.01)

(58) Field of Classification Search
CPC . G01V 3/38; G01V 3/34; G01V 13/00; G01V 1/48; G01V 1/50; G01V 2210/322; G01V 2210/324; G01V 2210/60; E21B 47/0224; E21B 47/085
See application file for complete search history.

(56) References Cited

U.S. PATENT DOCUMENTS 5,678,643 A * 10/1997 Robbins .................... E21B 7/04 175/45
2015/0036460 A1* 2/2015 Kinoshita .............. G01V 1/345 367/7
2021/0157026 A1* 5/2021 Yang ......................... G01V 3/34
2021/0318465 A1* 10/2021 Prindle .................. G01V 1/282

FOREIGN PATENT DOCUMENTS

NO 20181227 A1 9/2018

OTHER PUBLICATIONS

Wang et al., "Using Stage Level Microseismic Analysis to Gain Insight into Fracture Efficiency and Completion Effectiveness," Unconventional Resources Technology Conference, 2018, available at: < https://www.osti.gov/servlets/purl/1477768 > (Year: 2018).*

(Continued)

*Primary Examiner* — Richard W. Crandall
(74) *Attorney, Agent, or Firm* — Jeffrey D. Frantz

(57) ABSTRACT

Methods and systems for managing completion of a well are disclosed. The method may include obtaining measurement data for a geological formation in which a wellbore of the well is positioned. Frequency-slowness data may be obtained based on the measurement data, and a heatmapping process may be performed to obtain heatmap data. The heatmap data may be based on a statistical characterization of multiple portions of the frequency-slowness data. Using the heatmap data, a dispersion curve extraction process may be performed to obtain at least one dispersion curve that indicates an acoustic mode supported by a portion of the wellbore. The method may also include using the acoustic mode to infer a well property for the well and obtaining a well model using, at least in part, the well property.

15 Claims, 16 Drawing Sheets

(56) References Cited

OTHER PUBLICATIONS

Ivanov et al., “Dispersion-curve imaging nonuniqueness studies from multi-channel analysis of surface waves (MASW) using synthetic seismic data” SEG Houston 2013 Annual Meeting, available at: < https://www.kgs.ku.edu/software/surfseis/Publications/IvanovEtAl2014segam2014-0425.1.pdf > published 2013 (Year: 2013).*

Ekstrom, M. P. et al., “Dispersion estimation from borehole acoustic arrays using a modified matrix pencil algorithm”, Conference Record of the Twenty-Ninth Asilomar Conference on Signals, Systems and Computers, Pacific Grove, CA, USA, 1995, pp. 449-453.

Gonzalez, R.C. et al,. “Morphological Image Processing—Opening and Closing”, Chapter 9 in Digital Image Processing, 2007, Pearson; 3rd edition, pp. 657-661.

* cited by examiner

FAST APPROACH FOR DISPERSION CURVE STACKING, VISUALIZATION AND CALIBRATION

FIELD

Embodiments disclosed herein relate generally to well modeling. More particularly, embodiments disclosed herein relate to systems and methods for modeling wells using acoustic log data.

BACKGROUND

Geological formations may host a range of resources. For example, geological formations may include trapped liquids and/or gases that may include hydrocarbons of various types. These hydrocarbons may be used for a variety of purposes.

Well logging tools may be used to probe the geological formations penetrated by a wellbore in order to obtain information regarding geological formation properties and/or properties of the wellbore itself. This information may be used to produce the hydrocarbons.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an aspect, a method for managing completion of a well is disclosed. The method may include: obtaining measurement data for a geological formation in which a wellbore of the well is positioned; processing the measurement data to obtain frequency-slowness data; performing a heatmapping process to obtain heatmap data, the heatmap data being based on a statistical characterization of multiple portions of the frequency-slowness data; performing, using the heatmap data, a dispersion curve extraction process to obtain at least one dispersion curve, the at least one dispersion curve indicating an acoustic mode supported by a portion of the wellbore; inferring, using the acoustic mode, at least one well property for the well; and, obtaining a well model for the well using, at least in part, the well property.

Performing the heatmapping process may include: performing a stacking process using at least a portion of the measurement data to obtain rough heatmap data; and, performing a filtering process on the rough heatmap data to obtain the heatmap data.

Performing the stacking process may include establishing a grid definition for the rough heatmap data, and combining the portion of the measurement data based on the grid definition to obtain the rough heatmap data.

Performing the filtering process may include applying at least one filtering algorithm to increase a signal to noise ratio of the rough heatmap data to obtain the heatmap data.

Performing the dispersion curve extraction process may include: performing a binarization process on the heatmap data to obtain binarized heatmap data; performing a region selection process based on the binarized heatmap data and a calibration curve to identify a subset of the heatmap data; and, performing a measurement data calibration process using the subset of the heatmap data to obtain the at least one dispersion curve. The calibration curve may be based on a presumed topology of the wellbore.

Performing the region selection process may include obtaining a mask for the heatmap data using the calibration curve and the binarized heatmap data, and applying the mask to the heatmap data to obtain the subset of the heatmap data.

The binarized heatmap data may include a plurality of regions and the mask may be based on a portion of the plurality of regions, and the portion of the plurality of the regions may be indicated by the calibration curve.

Performing the measurement data calibration process may include obtaining a best fit curve to the subset of the heatmap data, the at least one dispersion curve being based on the best fit curve.

Performing the heatmapping process may include: generating, using at least a portion of the measurement data and a kernel-based heatmap generation algorithm, a plurality of heatmap data candidates, the plurality of heatmap data candidates being associated with a plurality of statistical metrics; and, selecting, based on the plurality of statistical metrics, the heatmap data from the plurality of heatmap data candidates.

Performing the dispersion curve extraction process may include identifying a plurality of calibration curve sets based on a presumed topology of the wellbore, and performing a measurement data calibration process using the plurality of calibration curve sets and the heatmap data to obtain the at least one dispersion curve.

Performing the measurement data calibration process may include: analyzing alignment of the plurality of calibration curve sets with the heatmap data to identify a best calibration curve set modifying, based on the heatmap data, the best calibration curve set to obtain a modified best calibration curve set; and, using a portion of the modified best calibration curve set as the at least one dispersion curve.

Performing the heatmapping process may include: performing a stacking process using at least a portion of the measurement data to obtain stacked frequency-slowness data; and, using a kernel-based heatmap generation algorithm to generate the heatmap data based on the stacked frequency-slowness data.

The method may further include: obtaining a well completion plan using, at least, the well model; completing the well using the well completion plan to obtain a completed well; and, obtaining an energy product using the completed well.

In an aspect, a non-transitory machine-readable medium having instructions stored therein, which when executed by a processor, cause the processor to perform operations for managing completion of a well is disclosed. The operations may cause the method, as discussed above, to be performed.

In an aspect, a data processing system is provided. The data processing system may include a processor; and a memory coupled to the processor to store instructions, which when executed by the processor, cause the processor to perform operations for managing completion of a well. The operations may cause the method, as discussed above, to be performed.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

Exploitation of subterranean resources may allow for hydrocarbon-based fuels to be produced, gaseous hydrocarbon products to be generated, and/or for other energy products to be obtained. To exploit the subterranean resources, wells used to extract the subterranean resources may be created.

Figure 1A:
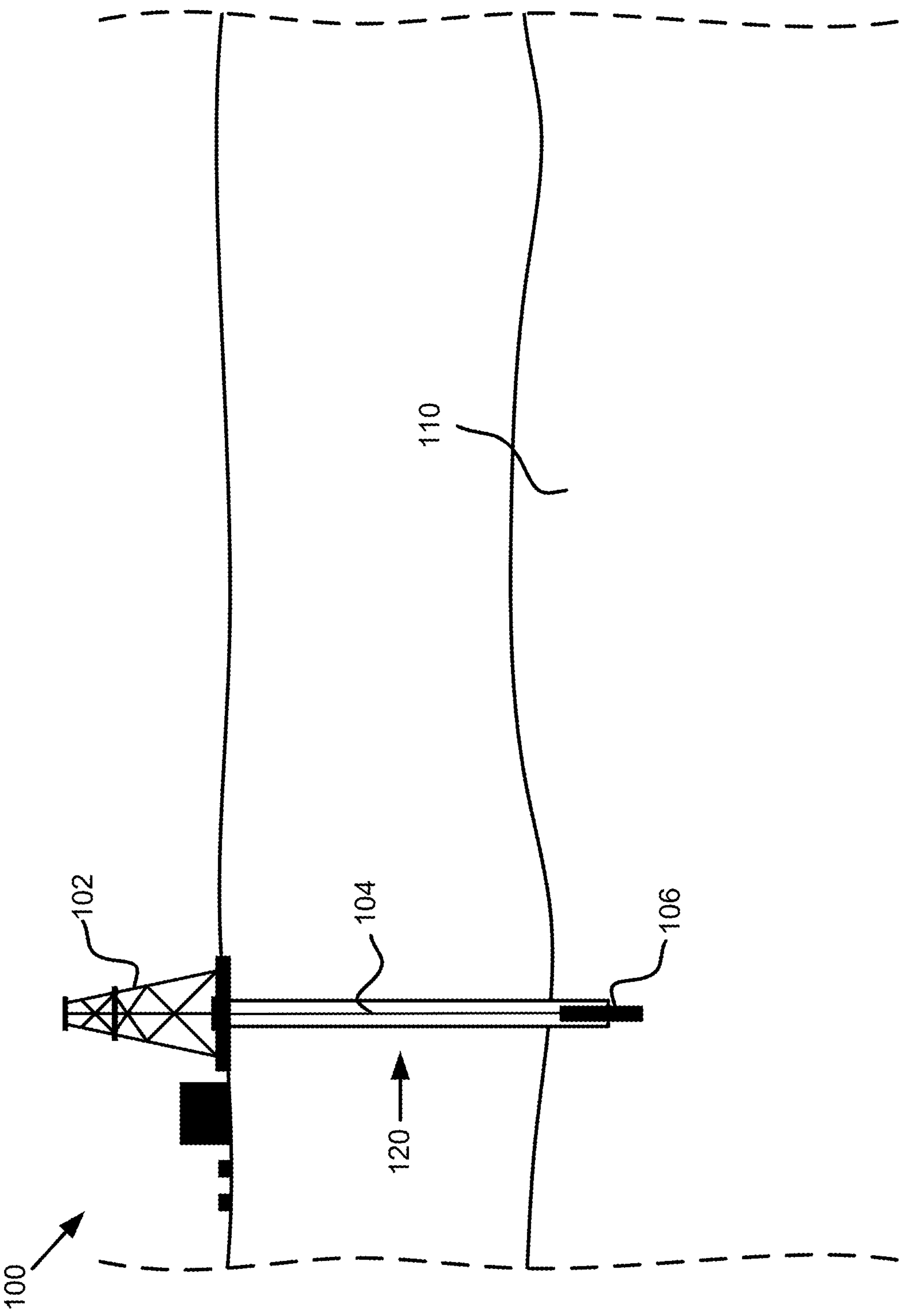
FIG. 1A shows a block diagram illustrating a first system in accordance with an embodiment.

Turning to FIG. 1A, a first block diagram illustrating a first system in accordance with an embodiment is shown. The first system may be used to exploit geological formation 110. Geological formation 110 may be a portion of the earth crust. In the example shown in FIG. 1A, geological formation 110 is illustrated as being a layer positioned on land; however, it will be appreciated that embodiments disclosed herein may be used with respect to geological formations positioned below oceans or other bodies of water.

Geological formation 110 may be usable, for example, to produce energy resources (e.g., hydrocarbons), to sequester undesired materials (e.g., greenhouse gases), and/or for other purposes. To exploit geological formation 110, well 120 may be drilled to provide for physical access to geological formation 110. In this manner, materials may be removed from and/or added to geological formation 110 (e.g., via well 120).

To determine how to exploit geological formation 110, information regarding the properties of geological formation 110 may be collected. To do so, tool 100 may be used. Tool 100 may include any of surface facility 102, drill string 104, bottom hole assembly 106, and/or other tools (e.g., logging tools, not shown).

Surface facility 102 may be a facility positioned above geological formation 110. While drawn in FIG. 1A as being positioned on land and including a derrick, surface facility 102 may be a waterborne vessel such as a drill ship or other type of sea-going vessel (e.g., a platform) without departing from embodiments disclosed herein.

Surface facility 102 may include, for example, (i) control systems for other components, (ii) materials (e.g., drilling mud, water, gases such as carbon dioxide) usable to form and characterize well 120 and/or geological formation 110, (iii) various assemblies and/or components usable with various assemblies, (iv) drill pipe and/or other components for well development, (v) completion components such as cement for completion of well 120, (vi) power systems, (vii) storage tanks for various materials used in well construction, and/or other materials, systems, etc. for well development.

Drill string 104 may include (i) any number of sections of drill pipe, (ii) wirelines usable to send control signals and/or power to downhole components, (iii) fluid lines and/or other lines for moving of fluids between bottom hole assembly 106 and/or surface facility 102, (iv) and/or other components usable as part of a drill string. Drill string 104 may connect bottom hole assembly 106 to surface facility 102, and may divide the wellbore into an annulus (e.g., an area between the outside of the drill pipe and wellbore walls) and interior of tool 100.

Bottom hole assembly 106 may provide for, in addition to other functions, performance of various tests on well 120 and/or portions of geological formation 110 proximate to well 120.

To obtain information regarding the properties of well 120 and/or geological formation 110, tool 100 may include various logging tools (not shown) that may collect and/or transmit measurement data (e.g., log data). A logging tool may be activated from surface facility 102, which may record well log data transmitted from the tool. For example, tool 100 may include a sonic logging tool that may be lowered into well 120 on a wireline in order to acquire a sonic log for well 120. The sonic log data may provide data usable to infer well properties of well 120 and local rock properties of geological formation 110 with different degrees of accuracy depending on a variety of factors. For example, the sonic log data usable to infer these properties may rely on a corresponding set of assumptions which may or may not be true. Thus, in order to obtain accurate information regarding the properties of geological formation 110, the well log data may require processing and/or may otherwise be manipulated.

The processed log data, along with other data regarding well 120 and/or geological formation 110, may be used to design a well completion plan for well 120 that may be likely to increase hydrocarbon recovery and/or reduce the costs associated with hydrocarbon recovery. Therefore, the manner in which the well log data is processed (e.g., the accuracy of the processed well log data, the ability to process large volumes of well log data efficiently) may impact a rate of hydrocarbon production using the well.

In general, embodiments disclosed herein relate to methods and systems for completing wells, obtaining information to aid in the modeling of wells and/or proximate geological formations for various uses. To complete the wells and to provide additional information regarding the wells (e.g., geological formations, casing or cement), after wellbores are drilled, various intervals along the wellbores (e.g., portions of a well) and/or corresponding proximate portions of geological formation may be characterized using well logging techniques. For example, well log information may be processed in order to infer rock properties of the geological formation surrounding the well that may, in some combination, indicate a likelihood of a presence of hydrocarbons, a likelihood of facilitating recovery of hydrocarbons, and/or other information relating to safe and cost-effective energy production via the well.

To increase the likelihood of completing the well in a manner that may effectively exploit subterranean resources, measurement data obtained via sonic logging may undergo a series of processing steps in order to accurately infer well properties of the well.

The processing steps may include, for example, (i) using the measurement data to obtain statistical characterizations of acoustic modes (e.g., dispersion curves) supported by various portions of the wellbore, (ii) refining the statistical characterizations using image processing techniques and models of the various portions of the wellbore to guide interpretation of and/or final selection (e.g., calibration) of signatures of the acoustic modes, (iii) using the selected signatures of the acoustic modes to infer well properties for portions of the wellbore, and/or (iv) using the well properties to guide completion of the well to facilitate the exploitation of the subterranean resources.

By doing so, the well properties inferred using sonic log data may be more accurate due to improved signal to noise ratios of the measurement data, exclusion of irrelevant measurement data for interpretation, constrained search spaces for signature calibration using modeled data, etc. These well properties (e.g., properties of the well and/or rock properties of the surrounding geological formation) may be used in combination with other data to obtain a well model, which may be used to establish a completion plan for the well and/or exploitation plan for the geological formation.

Completion plans may be obtained in an automated (e.g., computer defined), semiautomated (e.g., computer guided with subject matter expert review/feedback), and/or manual (e.g., subject matter expert defined) manner. Once obtained, wells may then be completed (and the geological formation may then be exploited) according to the plans. Thus, the resulting wells and corresponding exploitation of the geological formation may be more likely to be desirable by virtue of the accuracy of the well properties used in the formulation of the completion plans. To obtain completion plans, a modeling system in accordance with an embodiment may be used.

Figure 1B:
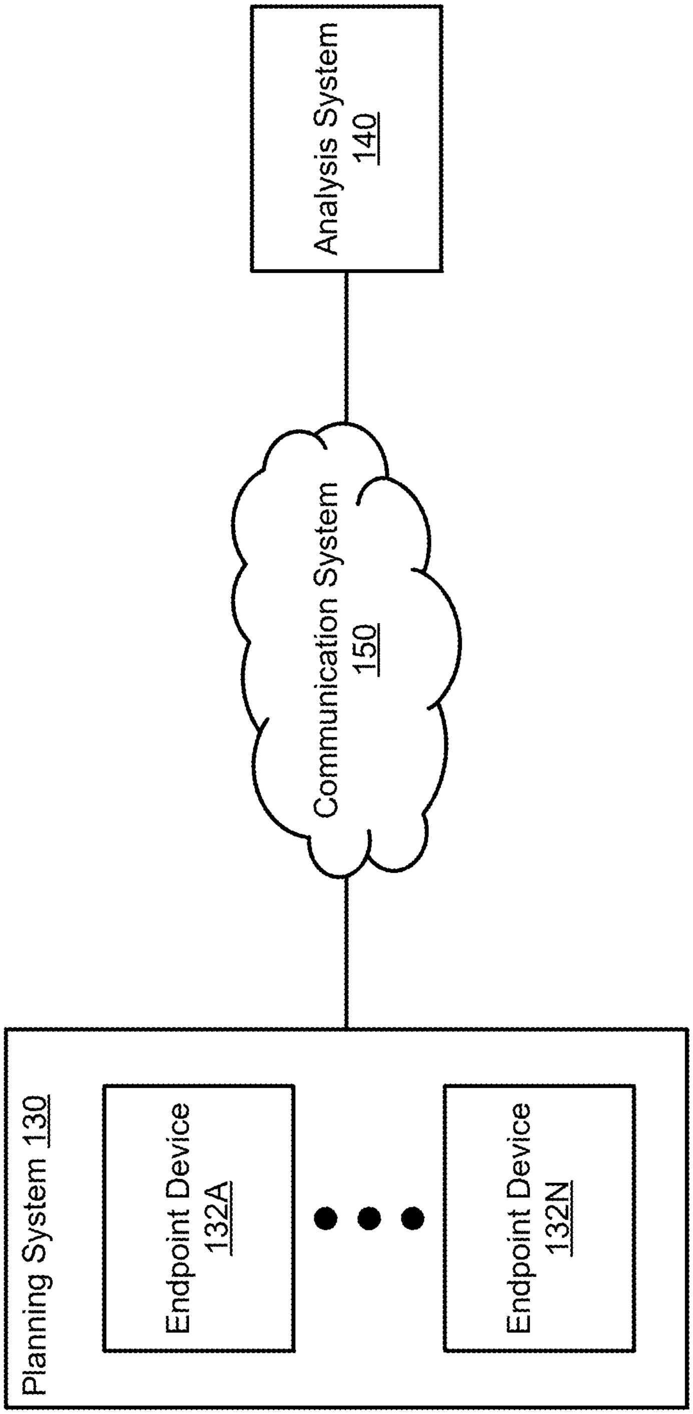
FIG. 1B shows a block diagram illustrating a second system in accordance with an embodiment.

Turning to FIG. 1B, a second block diagram illustrating a second system in accordance with an embodiment is shown. The second system may be used to establish completion plans for wells. To provide the above noted functionality, the modeling system of FIG. 1B may include planning system 130, analysis system 140, and communication system 150. Each of these components is discussed below.

Planning system 130 may facilitate completion planning for wells. To do so, planning system 130 may gather and provide information regarding a not-yet-completed well to analysis system 140. The information may have been obtained using a variety of downhole tools such as a micro-imager (e.g., measures resistivity along the wellbore), sonic tools (e.g., acoustic or other sounds-based measurements), spectroscopic tools (e.g., measurements based on nuclear properties), and/or other types of downhole tools. For example, the information may include information from processed sonic log data (e.g., statistical characterizations of acoustic modes, such as dispersion curves) and/or other data (e.g., seismic data, other log data).

Based on the provided data, analysis system 140 may return well properties, including (i) properties of the rock forming the geological formation in which the wellbore is positioned, (ii) properties of wellbore casing and/or cement (e.g., for evaluation of cement placement and/or quality), and/or (iii) other well properties. Planning system 130 may use this information to define a completion plan, and/or manage completion of a well based on the completion plan.

For example, planning system 130 may use the well properties and/or other information to define a topology of the completed well. The topology may be defined in an automated manner (e.g., automatic selection of where the well will interact with the geological formation), semi-automated (e.g., suggest where the well will interact with the geological formation, allow a subject matter expert to confirm/reject/modify the suggestion), and/or manual manner (e.g., allow the subject matter expert to review and use the information to define the completion plan).

To provide its functionality, planning system 130 may include any number of endpoint devices (e.g., 132A-132N). The endpoint devices may include various types of computing devices used by personnel working on completion of the wells.

Analysis system 140 may analyze the data provided by planning system 130 to identify rock properties and/or other information (e.g., zones of interest of the geological formation and/or along the wellbore). Once obtained, the rock properties may be used to obtain various graphical user interfaces (and/or other types of interfaces) usable by automated systems and/or subject matter experts to identify more promising locations along a wellbore with respect to hydrocarbon production. The graphical user interfaces and/or underlying data may be provided to planning system 130. Refer to FIGS. 2A-2E for additional details regarding information provided by analysis system 140 to planning system 130.

When providing their functionality, any of (and/or components thereof) planning system 130 and analysis system 140 may perform all, or a portion, of the actions and methods illustrated in FIGS. 2A-4.

Any of (and/or components thereof) planning system 130 and analysis system 140 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1B may be operably connected to each other (and/or components not illustrated) with communication system 150. In an embodiment, communication system 150 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1B as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2E. In these diagrams, flows of data and processing of data are illustrated using different sets of shapes. A first set of shapes (e.g., 200, 206, etc.) is used to represent data structures, a second set of shapes (e.g., 202, 262, etc.) is used to represent processes performed using and/or that generate data, and a third shape (e.g., 204) is used to represent large scale data structures such as databases. Additionally, as part of the flows of data, various data processing operations may be performed. FIGS. 3A-3G show data plots illustrating examples of and/or results of the data processing operations in accordance with an embodiment.

Figure 2A:
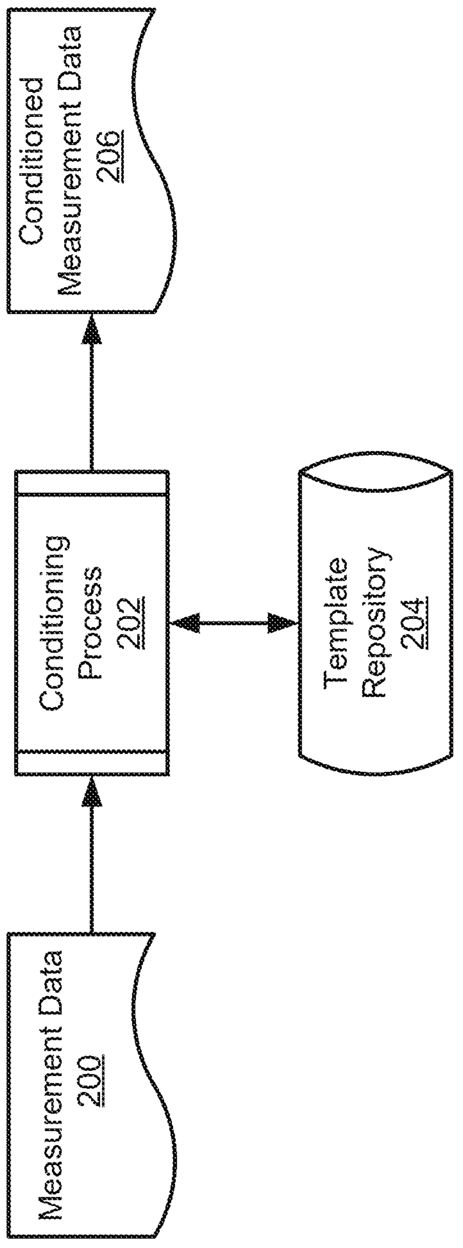
FIGS. 2A-2E show data flow diagrams in accordance with an embodiment.

Turning to FIG. 2A, a first data flow diagram in accordance with an embodiment is shown. The first data flow diagram may illustrate data used in and data processing performed in preparing measurements for well modeling.

To prepare the measurements for modeling, conditioning process 202 may be performed. During conditioning process 202, measurement data 200 may be processed in order to (i) extract relevant information for inferring well properties, (ii) remove artifacts and/or statistical outliers, and/or (iii) otherwise place the measurement data in a form for subsequent modeling. For example, the resulting conditioned measurement data 206 may be compatible with various analysis algorithms and/or well modeling processes.

During conditioning process 202, information from template repository 204 may be utilized. Template repository 204 may include various templates usable for constraining measurement data 200 so that conditioned measurement data 206 is more likely to be able to be successfully analyzed. For example, the templates may be based on theoretical or computational models of various types of wellbores and their expected responses to well logging (e.g., sonic logging). For example, the various templates stored in template repository 204 may be determined based on wellbore parameters (e.g., casing, tubing and/or mud attributes), and/or previous analysis of sonic log data.

Measurement data 200 may include multiple measurements made by and/or information derived based on a sonic tool (e.g., sonic log data and/or data generated based on the sonic log data). Each measurement may be a continuous or discrete characterization of the portions of the well. For example, to obtain measurement data 200, the measurements may be made by moving a sonic tool along the wellbore (e.g., from the near surface down through the layers of the geological formation). During the movement, the sonic tool may emit sound waves from a source in order to excite a response from the well before being recorded at a receiver.

The data recorded by the sonic tool may indicate presence of multiple acoustic modes. The signal attenuation and travel time of the various modes from the source to the receiver (e.g., slowness) may be measured as the sound waves are dispersed in space and time. For example, a sonic tool (e.g., to generate a dipole sonic log) may stimulate the geological formation using sound waves to measure the shear wave responses to the geological formation (e.g., shear anisotropy, shear attenuation, shear slowness). Or, for example, a sonic tool (e.g., to generate a monopole sonic log) may stimulate the geological formation using sound waves to measure Stoneley wave responses to the geological formation (e.g., transmissivity, reflectivity). The various acoustic mode responses may be identified based on the measurement data.

Figure 2B:
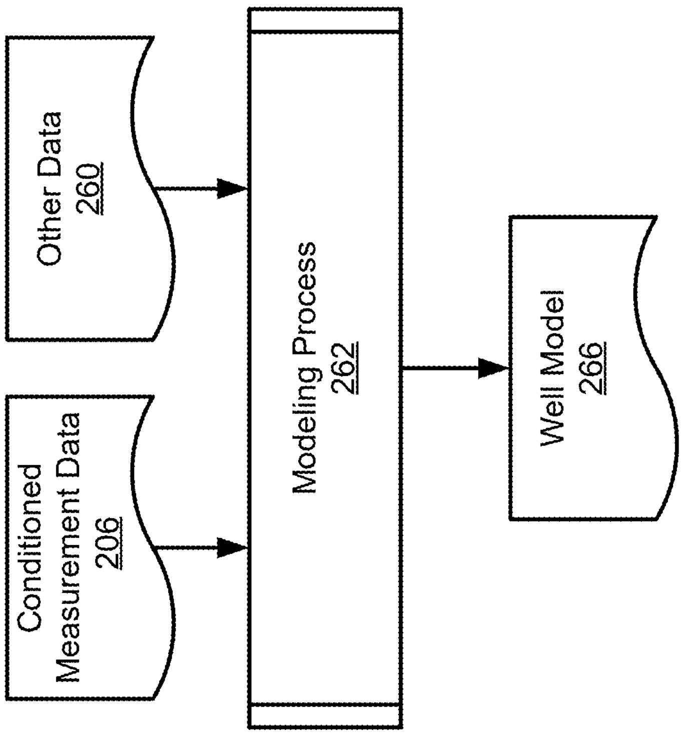
Figure 2C:
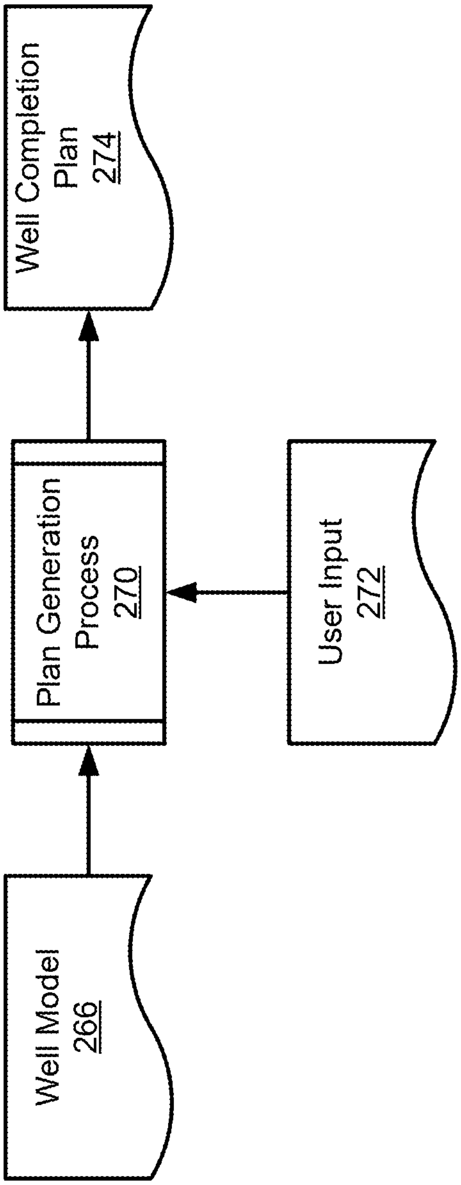
Figure 2D:
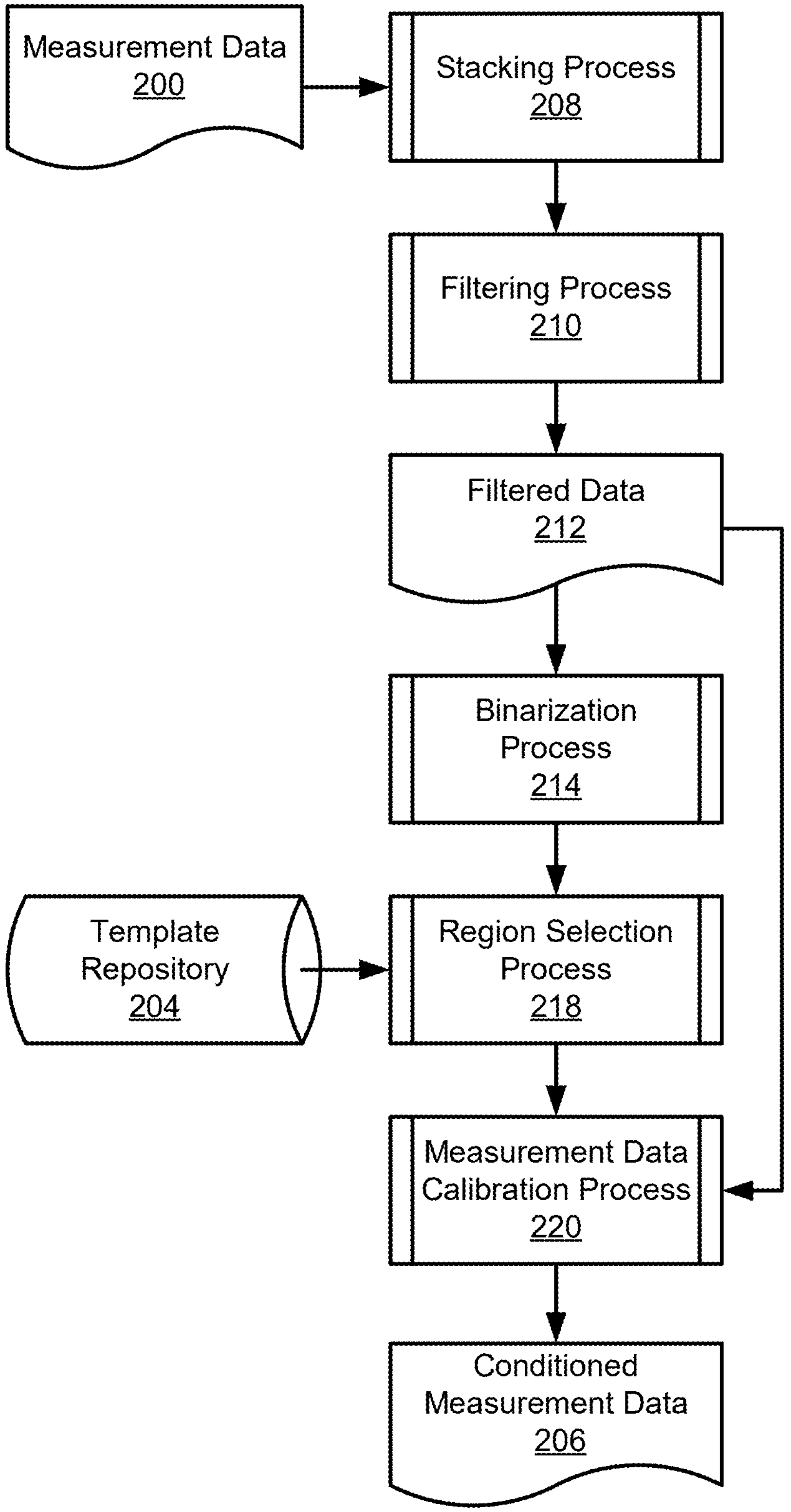
Figure 2E:
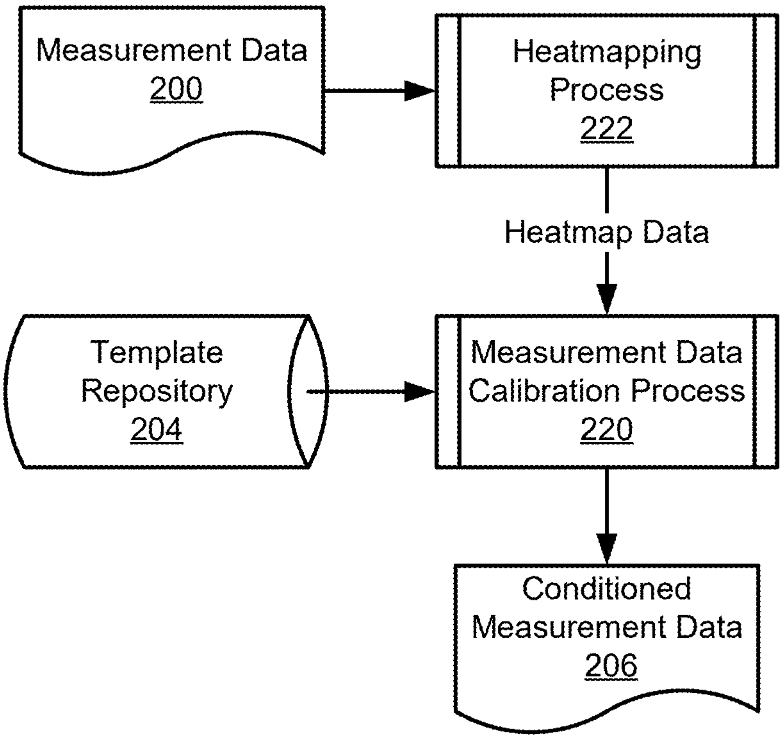

To identify the acoustic mode responses, the measurement data may be algorithmically processed using a variety of different algorithms. The output of these algorithms may be frequency-slowness data. The frequency-slowness data may be used to obtain conditioned measurement data 206. Refer to FIGS. 2D-2E for more information regarding conditioning process 202.

Once obtained, conditioned measurement data 206 may be used to guide completion of the well. For example, conditioned measurement data 206 may be used to infer well conditions and/or characteristics of the geological formation surrounding the well. Accordingly, any of the measurements may characterize the well and/or geological formation along all, or a portion, the wellbore. This information may be used to decide how to complete the well, such as where to install completion components such as chokes, packers, perforations, and/or other types of components that may be used to modify a manner in which the well operates. Refer to FIGS. 2B-2C for more information regarding use of conditioned measurement data 206 in well completion.

Turning to FIG. 2B, a second data flow diagram in accordance with an embodiment is shown. The second data flow diagram may illustrate data used in and data processing performed in obtaining a well model usable to guide a completion of a well.

To obtain well model 266, modeling process 262 may be performed. During modeling process 262, conditioned measurement data 206 and other data 260 may be ingested and used to generate well model 266. Conditioned measurement data 206 and other data 260 may include information regarding different types of measurements of the well and/or the geological formation.

For example, conditioned measurement data 206 may include information derived from frequency-slowness data (e.g., sonic logs), such as dispersion curves relevant to various portions (e.g., measured depth intervals) of the well. Other data 260 may include, for example, seismic data, well log data, core analysis data, fracture data, historical production information (e.g., for other proximate wells), and/or any other data usable for well modeling, geological modeling, etc.

During modeling process 262, well properties (including properties of the geological formation) may be inferred based on the ingested data. For example, conditioned measurement data 206 (e.g., dispersion curves) may include strong signatures indicative of various well conditions, such as formation properties, well properties (e.g., casing information, mud parameters), etc. Other data 260, for example, may be used to infer a structural framework of a geological model of the formation, rock properties and/or types included in the geological formation, information usable to characterize the topology of the well, etc.

The resulting well model 266 may include a model of the well and/or a geological model of the geological formation proximate to the well. Well model 266 may be used as a static model as input to a reservoir simulation process and/or to obtain a well completion plan.

Turning to FIG. 2C, a third data flow diagram in accordance with an embodiment is shown. The third data flow diagram may illustrate data used in and data processing performed in obtaining a well completion plan usable to complete a well.

To obtain well completion plan 274, plan generation process 270 may be performed. During plan generation process 270, well model 266 may be analyzed to identify portions of the geological formation that are composed of materials that may facilitate energy production via the well. Portions of the wellbore corresponding to the identified portions of the geological formation may also be identified and may be used to generate well completion plan 274. A user may provide user input 272, which may include values for various criteria and/or other information that may influence the outcome of plan generation process 270 (e.g., well completion plan 274). Well completion plan 274 may include any number of actions to be performed to complete the well.

Once obtained, well completion plan 274 may be used to complete a well. For example, all or a portion of the actions specified by well completion plan 274 may be performed to complete the well. Once completed, the completed well may be used, for example to bring various types of hydrocarbons to the surface. It will be appreciated that the well may be used for other purposes without departing from embodiments disclosed herein.

As previously discussed, conditioned measurement data may be used to complete wells. FIGS. 2D-2E show example processing flows usable to obtain conditioned measurement data from the measurement data. However, it will be appreciated that the processing steps of the example processing flows may be performed in different orders (e.g., sequentially or in parallel), any may be omitted, and other may be performed without departing from embodiments disclosed herein.

Turning to FIG. 2D, a fourth data flow diagram in accordance with an embodiment is shown. The fourth data flow diagram may illustrate a first example of data used in and data processing performed in order to obtain conditioned measurement data for a well (e.g., for a geological formation in which a wellbore of the well is positioned).

To obtain the conditioned measurement data (e.g., 206), measurement data 200 may be obtained. To obtain measurement data 200, sonic log data may be obtained (e.g., recorded) for the well. As previously discussed, measurement data 200 may include output from an algorithmic (decomposition) process that ingests the sonic log data. The algorithmic process may include decomposing the sonic log data into frequency-slowness data (e.g., pairs) for various portions of the wellbore (e.g., at various measured depths of the well). For example, measurement data 200 may be output from a modified matrix pencil algorithm used to estimate dispersion, known as a "TKO" process. Data plots of an example of measurement data 200 are shown in FIG. 3A.

FIGS. 3A-3G show data plots of examples of data as it is processed during conditioning process 202 of FIG. 2A in accordance with an embodiment. In the data plots, example plots of frequency-slowness data based on measurement data 200 are shown. The horizontal axes indicate frequency values (e.g., increasing in the direction of arrow 304) and vertical axes indicate slowness values (e.g., increasing in the direction of arrow 306), unless otherwise specified. The respective plots shown in these figures illustrate steps in the processing of the frequency-slowness data to obtain conditioned measurement data 206. It will be appreciated that the data used in the creation of these data plots is merely illustrative and that in practice, the data may be different than as illustrated in these data plots.

Figure 3A:
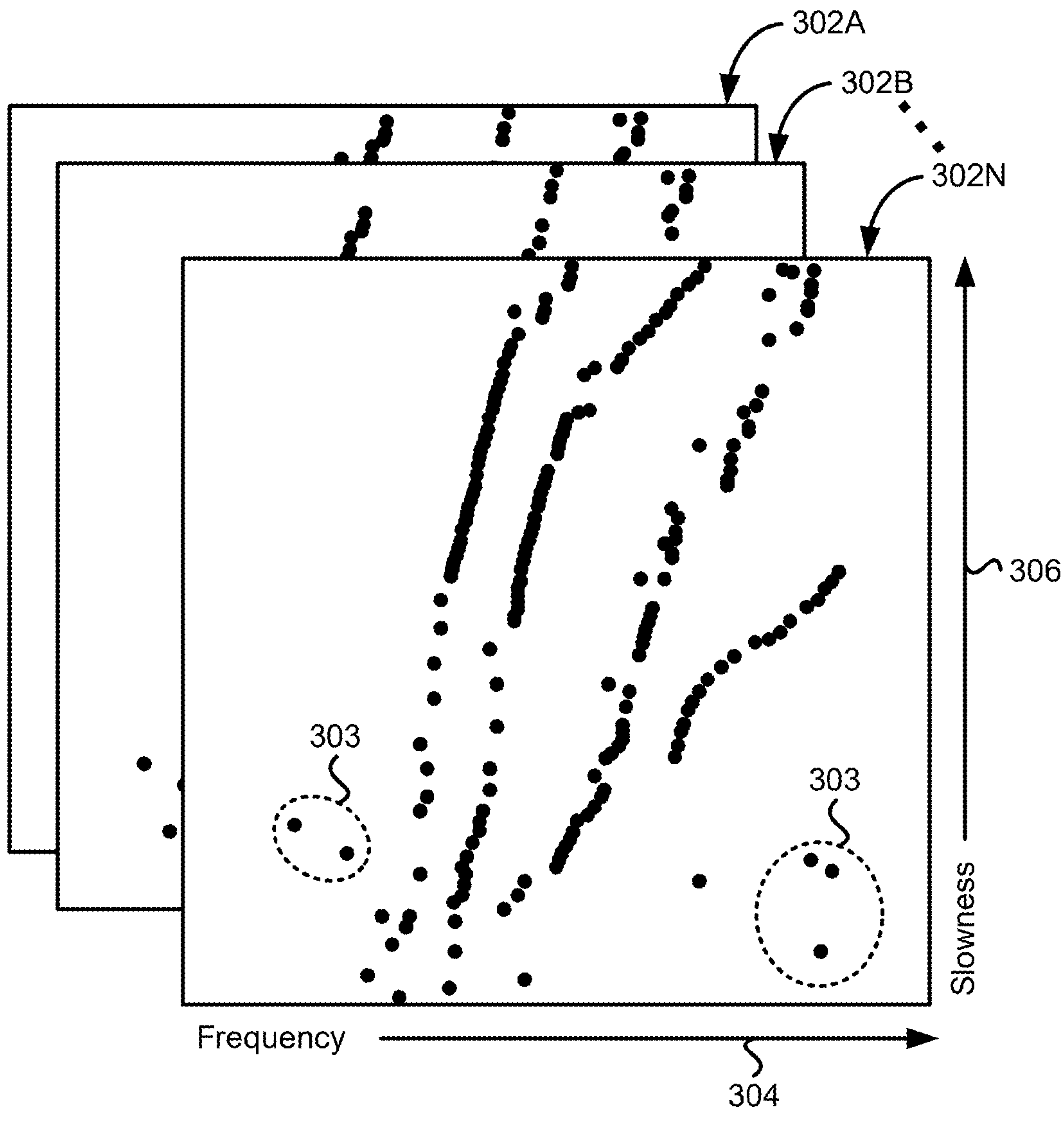
FIGS. 3A-3G show plots of data in accordance with an embodiment.

Turning to FIG. 3A, a first set of data plots are shown in accordance with an embodiment. The first set of data plots may include an example of measurement data 200 (e.g., data output from TKO processing). The first set of data plots show frequency-slowness data derived from the sonic log data.

Measurement data 200 may be output from the algorithmic decomposition process at a specified depth interval (e.g., based on the sample rate of the sonic log data, processing objectives, and/or other factors). Thus, each of data plots 302A, 302B, and 302N may represent decomposed sonic log data for different portions of the wellbore (e.g., adjacent depth intervals). Data plots 302A-302N may include any number of data plots (e.g., depth frames).

Data plot 302N shows trends in the frequency-slowness data trends that may indicate acoustic modes supported by the corresponding portion of the wellbore and may therefore be considered signal (e.g., desired recorded energy). However, measurement data 200 may also include noise (e.g., undesired recorded energy, such as data points inside regions 303) that may obscure the signal and make identifying the acoustic mode curves (e.g., dispersion curves) more difficult. The noise may present as random, whereas the signal may present as coherent (e.g., with respect to data plots at adjacent depth intervals); therefore, in order to reduce the noise and/or increase the signal in the data plots, frequency-slowness data for adjacent depth intervals may be combined in stacking process 208.

Returning to FIG. 2D, to perform stacking process 208, various global processing parameters may be set. For example, a user may define parameters such as (i) frequency and/or slowness ranges for analysis (e.g., based on a particular acoustic mode targeted for analysis), (ii) a target depth frame of the wellbore (e.g., a portion of the wellbore, such as a wellbore interval) for analysis, (iii) a stacking aperture (e.g., a number of depth frames adjacent to the targeted depth frame to be included in the analysis), (iv) thresholds for analysis (e.g., based on tolerance, amplitude, error, etc.), (v) stacking resolution (e.g., based on sampling intervals of measurement data 200), and/or (vi) other parameters that may define how portions of measurement data 200 are combined. These global processing parameters may be set at an initial stage of the analysis and may be subject to change when performing an iterative analysis process (e.g., based on data visualization of iterations of processed results).

During stacking process 208, various depth frames adjacent to the target depth frame (e.g., specified by the stacking aperture) may be combined to replace the target depth frame and to improve the signal to noise ratio of the target depth frame. The adjacent depth frames may be combined according to a stacking function. The stacking function may be based on the global processing parameters. The global processing parameters may be determined based on data quality and/or other factors in order to strike a balance between signal preservation and noise reduction. For example, a larger number of depth frames may be combined in order to reduce random noise (e.g., for noisy data); or, a smaller number of depth frames may be combined in order to preserve resolution of the signal (e.g., for poorly sampled data).

The various depth frames adjacent to the target depth frame may be combined based on the stacking resolution. For example, a two-dimensional grid/mesh may be defined by user-specified frequency and slowness intervals, which may define cell boundaries of the mesh. For each cell of the mesh, a count value may be obtained using the stacking function. For example, the stacking function may define the count value for a cell to be a total number of frequency-slowness data pairs that contribute to the cell from each adjacent depth frame.

The stacking function may weight the contribution of the frequency-slowness data pairs from adjacent depth frames based on statistical characterizations of the data of the adjacent depth frames. For example, the stacking function may weight contributions based on a proximity of an adjacent depth frame to the target depth frame, based on a statistical characterization of the data of the adjacent depth frame (e.g., a signal to noise ratio), etc. As a result, cells that include signal will have higher count values than cells that include noise. Thus, stacking process 208 may increase the signal to noise ratio of measurement data 200. A data plot of an example of measurement data 200 after stacking process 208 is shown in FIG. 3B.

Figure 3B:
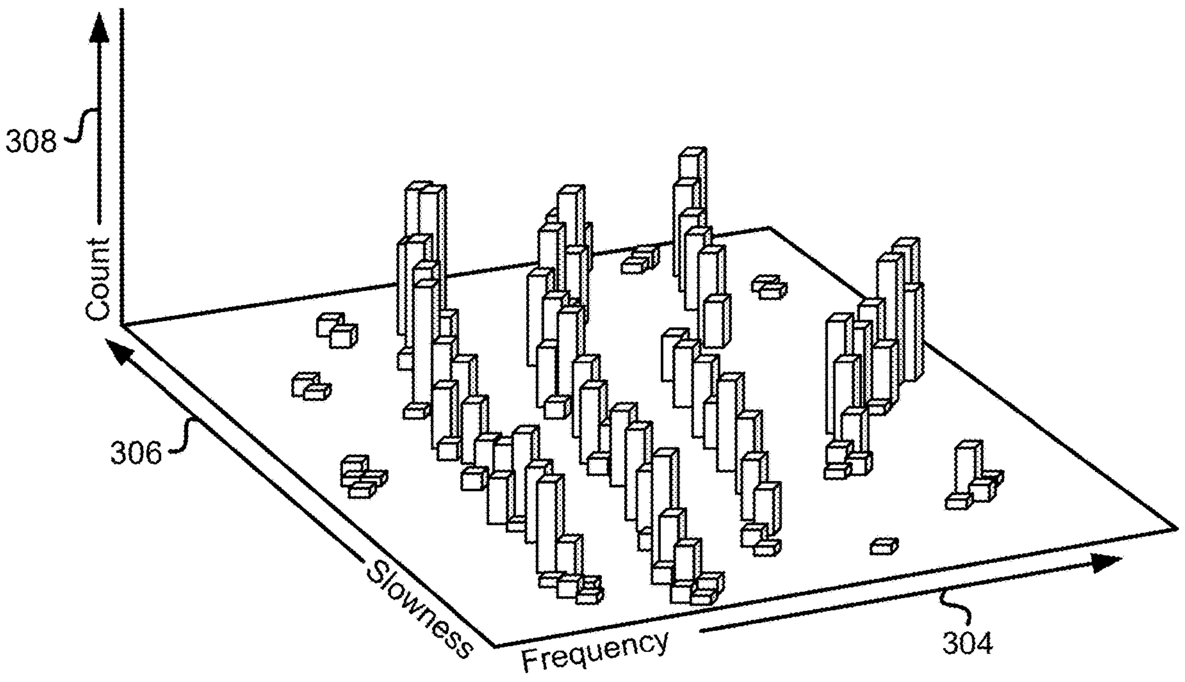

Turning to FIG. 3B, a second data plot is shown in accordance with an embodiment. In the second data plot, an example plot of combined frequency-slowness data is shown as a three-dimensional (3D) histogram. In the example plot shown, a first axis indicates frequency values (e.g., increasing in the direction of arrow 304), a second axis indicates slowness values (e.g., increasing in the direction of arrow 306), and a third axis indicates count (e.g., increasing in the direction of arrow 308). Cells with higher count values may include signal (e.g., dispersion curves for the various acoustic modes), whereas cells with lower count values (near zero) may include residual noise.

After stacking process 208, the continuity of the acoustic mode curves (e.g., dispersion curves) may be improved due to signal contributions and/or noise cancellation effects from adjacent depth frames. Although some cells of the 3D histogram show some residual noise, the overall noise levels may be reduced (e.g., signal to noise ratios may be improved) by stacking process 208. Data used to generate the 3D histogram (e.g., combined portions of measurement data 200) may be displayed as a digital image that uses a system of color coding to represent different count values, such as a heatmap. This visual representation of combined measurement data 200 may be referred to as a rough heatmap, as other image processing techniques may be applied to further improve the signal-to-noise ratio of measurement data 200 in order to obtain heatmap data for use in obtaining conditioned measurement data 206.

Returning to FIG. 2D, the combined portions of measurement data 200 (e.g., rough heatmap data) may be filtered in order to improve its interpretability. To do so, filtering process 210 may be performed. During filtering process 210, various image processing filters may be applied to the rough heatmap data. The application of these filters may reduce noise and/or emphasize signal in the rough heatmap data. For example, the rough heatmap data may be processed using convolution filters (e.g., using Gaussian kernels, Laplacian kernels, etc.) that may modify the rough heatmap data to improve contrast between signal and noise, and/or visualization filters may be applied (e.g., color rescaling, histogram equalization methods, etc.) in order to improve visual interpretability of the rough heatmap data.

Filtering process 210 may be applied to the rough heatmap data to obtain filtered data 212. Filtered data 212 may include processed heatmap data. An example data plot of heatmap data obtained as output from filtering process 210 is shown in FIG. 3C.

Figure 3C:
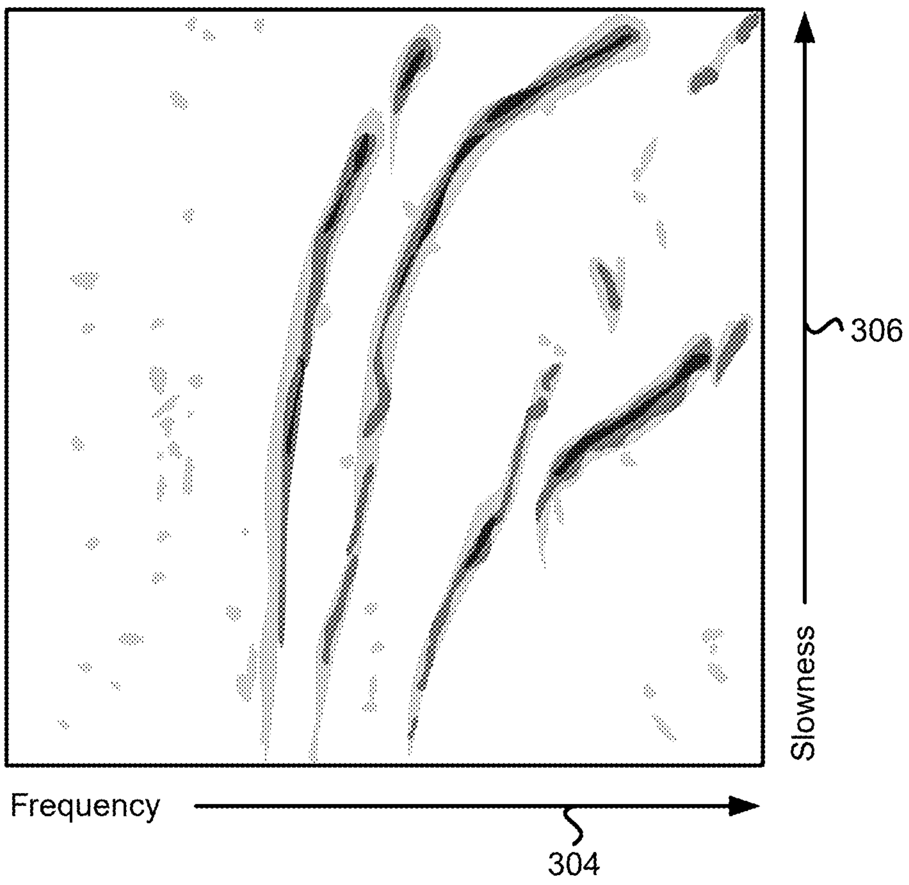

Turning to FIG. 3C, a third data plot is shown in accordance with an embodiment. In the third data plot, an example plot of heatmap data is shown, where darker shades of gray indicate higher amplitude (e.g., count value) data, lighter shades of gray indicate lower amplitude data, and white indicates zero amplitude data. To obtain the heatmap shown in FIG. 3C, any other types of processing techniques (e.g., denoising algorithms, signal enhancement algorithms) may be performed in addition to stacking process 208 and/or filtering process 210 that may improve the continuity, resolution, and/or quality of the signal (e.g., the dispersion curves).

Returning to FIG. 2D, filtered data 212 (e.g., the heatmap data) may be ingested into binarization process 214. Binarization process 214 may be performed in order to define and/or further improve the structure and/or continuity of the signal. The output of binarization process 214 may include a reduced, binary form of the heatmap data. For example, an amplitude threshold may be set (e.g., by a user based on a visual inspection of the heatmap data, automatically based on statistical characterizations of the heatmap data). Then, the heatmap data with amplitude values that are inferior to the amplitude threshold may be assigned a value of zero, while all other heatmap data with amplitude values (that are equal to and/or that exceed the amplitude threshold) may be assigned a value of one. The values may then be plotted in order to define regions of amplitude values above the threshold.

During binarization process 214, any of the regions may be labeled (e.g., using color or text for visual identification), expanded, and/or removed (e.g., using morphological operations). For example, any of the regions may be cleaned (e.g., to remove isolated points), gaps between distinct regions may be closed or bridged (e.g., joined) to create continuous regions that may correlate with continuous dispersion curve energy. Or, for example, regions may be removed based on statistical characterizations of the data included in the region (and corresponding thresholds), such as a number of image pixels that contribute to the region. Binarization process 214 may be performed automatically (e.g., using pre-determined processing flows and/or sets of parameters) and/or based on real-time input from a user.

Figure 3D:
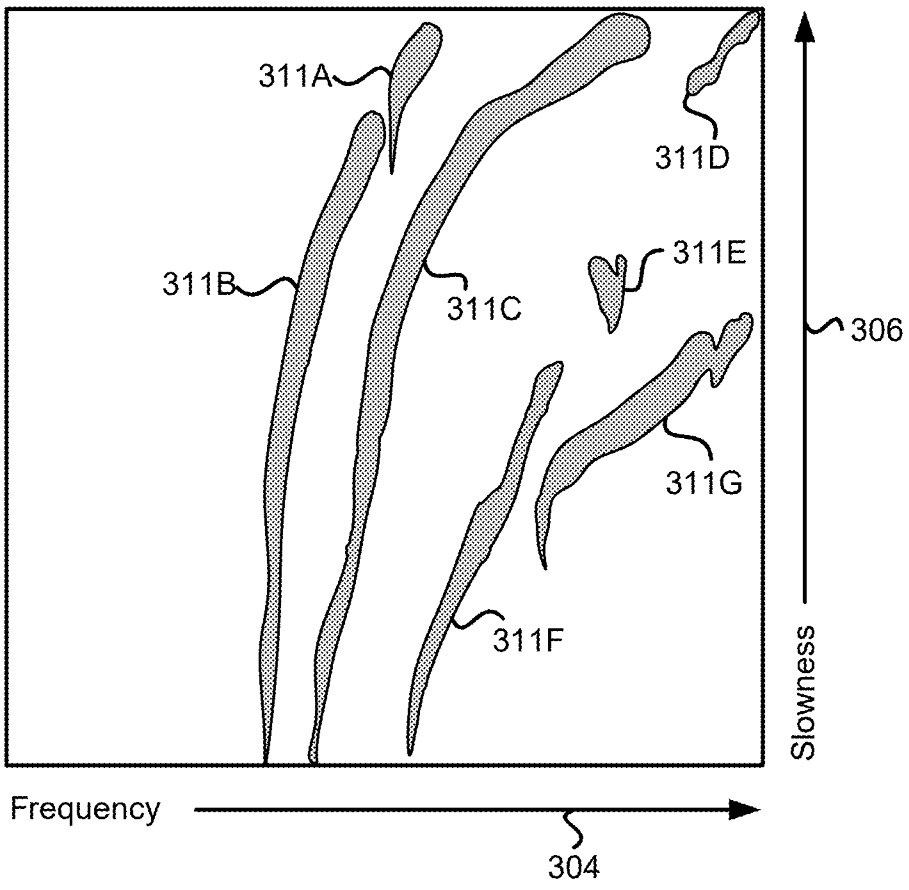

An example data plot of a binarized image of the heatmap data that may be obtained as output from binarization process 214 is shown in FIG. 3D.

Turning to FIG. 3D, a fourth data plot is shown in accordance with an embodiment. In the fourth data plot, an example plot of binarized heatmap data is shown, where gray indicates binary value one, and white indicates binary value zero. Regions 311A-311G indicate areas of the plot where amplitudes of the heatmap data are above the amplitude threshold specified in binarization process 214. As discussed, during binarization process 214, any of the regions shown (e.g., 311A-311G) may have been expanded or joined, and some regions initially defined based on the amplitude threshold may have been removed.

The binarized image may be visualized for quality control purposes (e.g., by a user). For example, the user may adjust the global processing parameters and/or any local processing parameters used to process measurement data 200 in order to modify the heatmap data and/or the binarized image before proceeding to region selection process 218.

Returning to FIG. 2D, to further refine the heatmap data for interpretation, region selection process 218 may be performed. Region selection process 218 may be performed based on the binarized image in order to identify regions that may indicate an acoustic mode supported by the target portion of the wellbore. Region selection process 218 may be performed manually (e.g., visually, by a user) and/or automatically using a calibration curve. When region selection process 218 is performed manually, the user may classify and/or identify regions of the binarized image that are expected to indicate an acoustic mode based on a visual inspection of the binarized image and/or using a calibration curve (e.g., a template) from template repository 204.

As discussed with respect to FIG. 2A, template repository 204 may include information usable to constrain measurement data 200. For example, template repository 204 may include sets of calibration curves usable to guide the user or an automated process in the selection of appropriate regions for interpretation of the heatmap data.

The calibration curve may be selected from template repository 204 based on a presumed topology of the wellbore. For example, the wellbore topology may be classified as a wellbore type, and the wellbore type may be used to query template repository 204 for an appropriate calibration curve. During region selection process 218, the calibration curve may be obtained and overlaid on the binarized image. The calibration curve may be used to identify a subset of regions of the binarized image (by the user and/or by an automated process).

For example, when region selection process 218 is performed automatically (e.g., by a computer without user intervention), regions of the binarized image may be identified as those that intersect with the calibration curve. To identify the intersecting regions, the calibration curve may be modified (e.g., using morphological transforms, logical operators, etc.). For example, the thickness of the calibration curve may be modified (e.g., dilated, constricted), the calibration curve may be extrapolated, truncated, etc., which may affect which regions intersect the modified calibration curve. An example data plot of a calibration curve overlaid on a binarized image is shown in FIG. 3E.

Figure 3E:
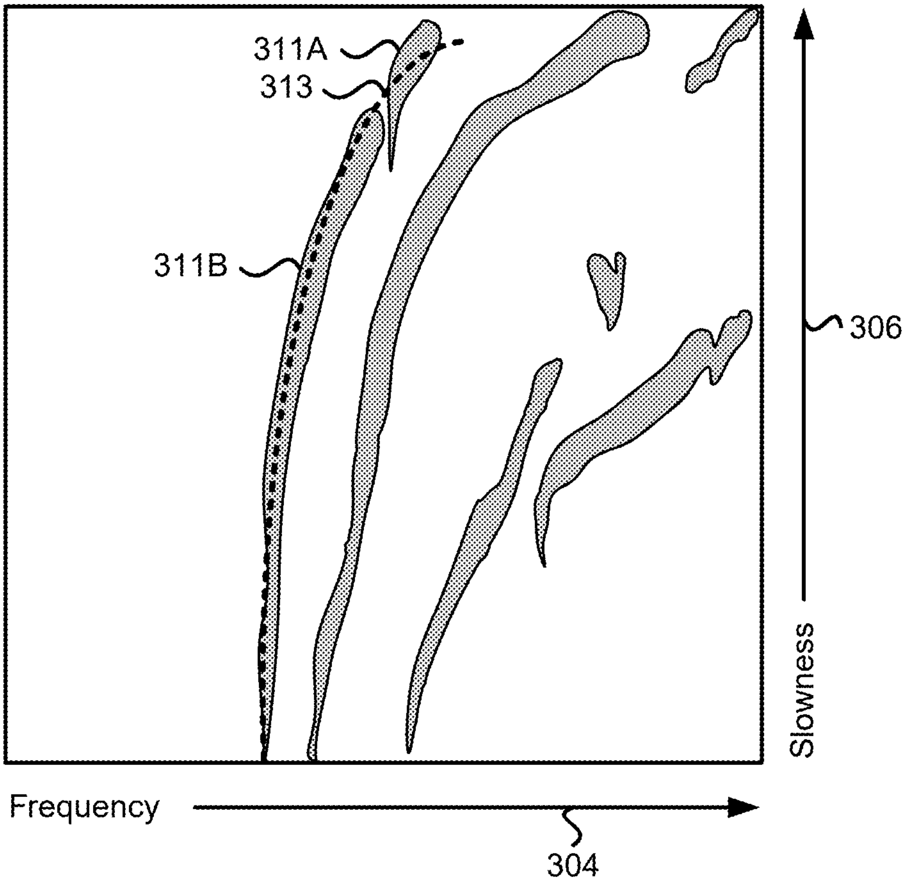

Turning to FIG. 3E, a fifth data plot is shown in accordance with an embodiment. In the fifth data plot, an example of a binarized image being used in a region selection process is shown. In FIG. 3E, calibration curve 313 (e.g., selected from template repository 204) is overlaid on the binarized image. In the example shown in FIG. 3E, calibration curve 313 passes through (e.g., intersects) region 311A and region 311B. Thus, regions 311A and 311B may be selected during the region selection process based on calibration curve 313. The selected regions may be used to define a mask.

The mask may be used to isolate a portion of the binarized image for further interpretation. The isolated portion may not include regions not intersected by the calibration curve. For example, the mask may include a binary image where regions 311A and 311B are assigned a non-zero value, while the remaining portions not covered by regions 311A and 311B are assigned a zero value. Once obtained, the mask may be processed (e.g., modified) in order to connect distinct regions, shrink or dilate regions, edges of the region(s) may be tapered, etc. The mask may then be applied to (e.g., multiplied with) other image data to improve the image data and/or subsequent analysis of the image data.

Returning to FIG. 2D, to obtain conditioned measurement data 206, measurement data calibration process 220 may be performed. During measurement data calibration process 220, the mask obtained from region selection process 218 may be applied to filtered data 212 (e.g., the heatmap data, shown in FIG. 3C) in order to obtain a subset of the heatmap data. For example, the subset of the heatmap data may include isolated portions of the heatmap data most likely to indicate acoustic mode signal.

Measurement data calibration process 220 may include obtaining a best fit curve to fit the subset of the heatmap data (e.g., the masked heatmap data). To do so, measurement data calibration process 220 may include (i) using a skeletonization procedure for the subset of the heatmap data (e.g., connecting, smoothing skeleton curves to obtain a continuous best fit curve), (ii) obtaining (e.g., computing) maximum values of the subset of the heatmap data, (iii) applying smoothing filters (e.g., Savitzky-Golay filter, locally estimated scatterplot smoothing (LOESS) filter, locally weighted scatterplot smoothing (LOWESS) filter, etc.), and/or (iv) the application of other methods for obtaining best fit curves.

The best fit curve may be used to obtain at least one dispersion curve for measurement data 200. The dispersion curve may be based on the best fit curve. For example, the best fit curve may be further smoothed and/or extrapolated (e.g., towards given slowness and/or frequency values) to obtain the dispersion curve. The smoothing and/or extrapolation operations may be performed by a user in real-time and/or automatically based on provided (global) parameters. The resulting dispersion curve may be stored (e.g., in template repository 204) along with associated metadata (e.g., wellbore type, target depth frame, processing parameters, etc.) for use in other conditioning processes of measurement data and/or as input to other processes (e.g., modeling process 262). An example data plot of a best fit curve overlaid on masked heatmap data is shown in FIG. 3F.

Figure 3F:
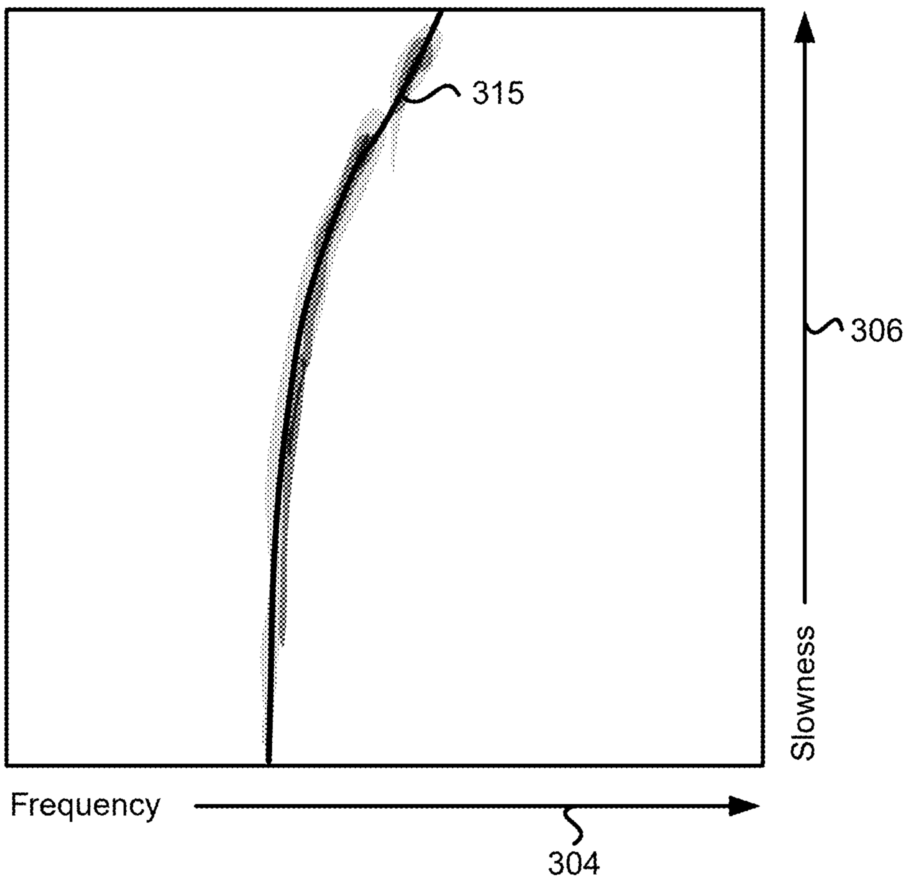

Turning to FIG. 3F, a sixth data plot is shown in accordance with an embodiment. In the sixth data plot, an example of a subset of heatmap data being used in a measurement data calibration process is shown. In FIG. 3F, the subset of heatmap data may be obtained by applying a mask from a region selection process (e.g., 218) to the heatmap data (e.g., filtered data 212) shown in FIG. 3C. The best fit curve obtained from the measurement data calibration process (e.g., best fit curve 315) is overlaid on the heatmap data. Best fit curve 315 may be a dispersion curve for an acoustic mode supported by the target depth frame of the wellbore.

The conditioning process shown in FIG. 2D (e.g., an example of conditioning process 202) may be performed for any number of target depth frames of measurement data 200; therefore, conditioned measurement data 206 may include any number of dispersion curves (e.g., for different target depth frames, for different acoustic modes, etc.). A second example of a conditioning process is described with respect to FIG. 2E.

Turning to FIG. 2E, a fifth data flow diagram in accordance with an embodiment is shown. The fifth data flow diagram may illustrate a second example of data used in and data processing performed in order to obtain conditioned measurement data for a well.

To obtain conditioned measurement data 206, heatmapping process 222 may be performed. During heatmapping process 222, measurement data 200 may be processed using a kernel-based heatmap generation algorithm (e.g., kernel density estimation). The kernel-based heatmap generation algorithm may be defined by a set of input parameters (e.g., a kernel function, smoothing parameters, etc.). During heatmapping process 222, at least one frequency-slowness heatmap plot (e.g., plotting a set of heatmap data) may be generated, along with corresponding statistical metrics (e.g., mean squared error). For example, a plurality of heatmap data candidates and corresponding statistical metrics may be generated during heatmapping process 222.

Heatmapping process 222 may include a selection process, where (a set of) heatmap data of the heatmap data candidates is selected. For example, the heatmap data may be selected based on its statistical metrics (e.g., compared to statistical metrics of other heatmap candidates). The selected heatmap data may include data trends indicating more than one acoustic mode (e.g., similar to the heatmap data shown in FIG. 3C). Once the heatmap data is selected, the heatmap data may be used in measurement data calibration process 220.

During measurement data calibration process 220, a plurality of calibration curve sets may be identified and selected from template repository 204. As discussed, template repository 204 may include calibration curve sets usable to guide interpretation of measurement data 200. The plurality of calibration curve sets may be identified based on a presumed topology of the wellbore. For example, the calibration curve sets may be identified based on wellbore parameters, along with variability of one or more of the parameters. These wellbore parameters and/or variability terms may be used to query template repository 204.

The plurality of calibration curve sets may represent multiple acoustic modes for multiple wellbore types. For example, one calibration curve set of the plurality of calibration curve sets may include calibration curves for multiple modes for a specified wellbore type at a given portion of the wellbore (e.g., the modeled response for multiple acoustic modes to the wellbore).

Once obtained, the plurality of calibration curve sets may be overlaid onto a plot of the heatmap data so that alignment of the plurality of calibration curve sets may be analyzed with respect to the heatmap data. For example, alignment between each calibration curve set and the multiple acoustic modes shown in the heatmap data may be analyzed visually by a user and/or via an automated process. By using a plurality of calibration curve sets, variations in wellbore topology may be considered, which may result in a more accurate conditioned measurement data. An example data plot of a plurality of calibration curve sets overlaid on heatmap data is shown in FIG. 3G.

Figure 3G:
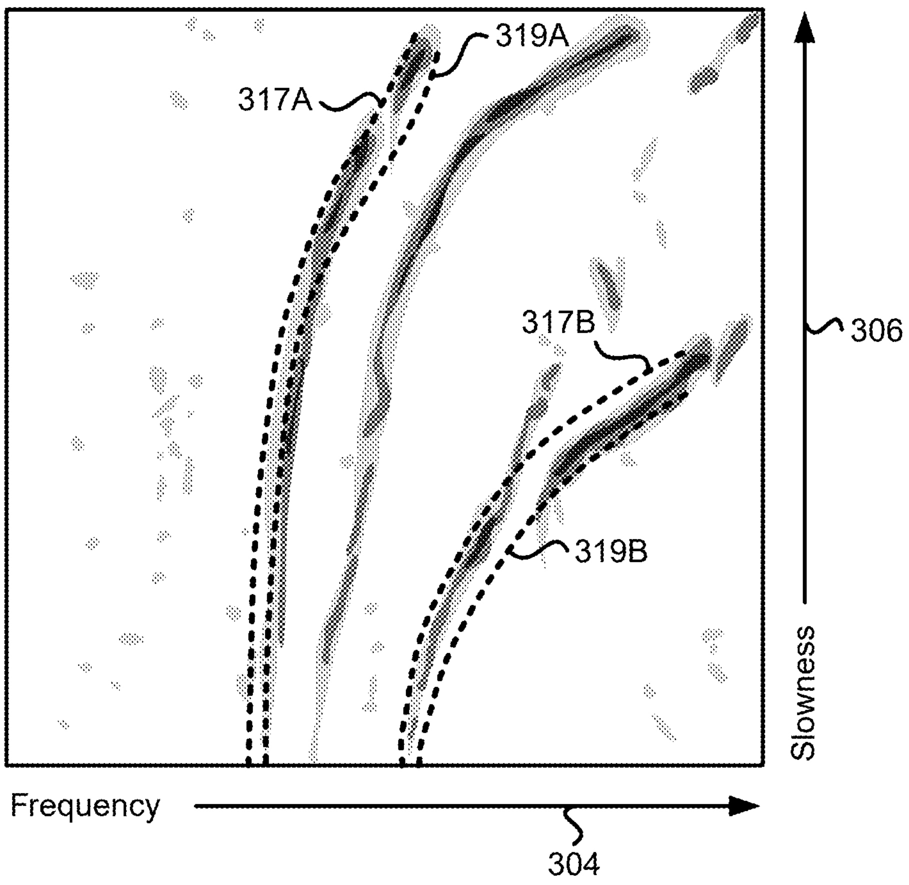

Turning to FIG. 3G, a seventh data plot is shown in accordance with an embodiment. In the seventh data plot, an example of a plurality of calibration curve sets used in a measurement data calibration process is shown. In FIG. 3G, the heatmap data is plotted with the plurality of calibration curve sets overlaid. Specifically, two calibration curve sets are shown, the first calibration curve set including curve 317A and curve 317B; and the second calibration curve set including curve 319A and curve 319B. Curve 317A and curve 319A correspond to a first acoustic mode (e.g., indicated by amplitudes of the heatmap data); and, similarly, curve 317B and curve 319B correspond to a third acoustic mode.

The data plot shown in FIG. 3G may be used to select a best calibration curve set. For example, a user may visually identify curve 319A and curve 319B as the best calibration curve set to use in order to obtain conditioned measurement data 206. Or, for example, an automated process may calculate statistical attributes based on heatmap data samples that correspond to (e.g., intersect with) each of the calibration curves in order to determine the best calibration curve set.

Returning to FIG. 2D, once the best calibration curve set is selected, the best calibration curve set may be modified based on the heatmap data. For example, the best calibration curve set may be translated (shifted), scaled, extrapolated, etc. in order to improve alignment with the heatmap data. When modifying the best calibration curve set, anchor points may be placed along the calibration curves in order to limit the modification (e.g., and to preserve the shape or character of portions of the calibration curves). A portion of the modified best calibration curve set may be used to obtain conditioned measurement data 206. For example, a single calibration curve of the modified best calibration curve set may be selected based on a target acoustic mode, and the selected calibration curve may be treated as conditioned measurement data 206 (e.g., a dispersion curve for the target acoustic mode).

Any of the data flows shown in FIGS. 2A-2E may be performed. Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flows shown in FIGS. 2A-2E, wellbore measurement data obtained from sonic logging may be conditioned in a manner that improves the accuracy of and therefore the trustworthiness of the resulting conditioned measurement data (e.g., dispersion curves for various depths of the wellbore). Doing so may improve the reliability and effectiveness of well completion plans generated for using the conditioned measurement data.

Figure 4:
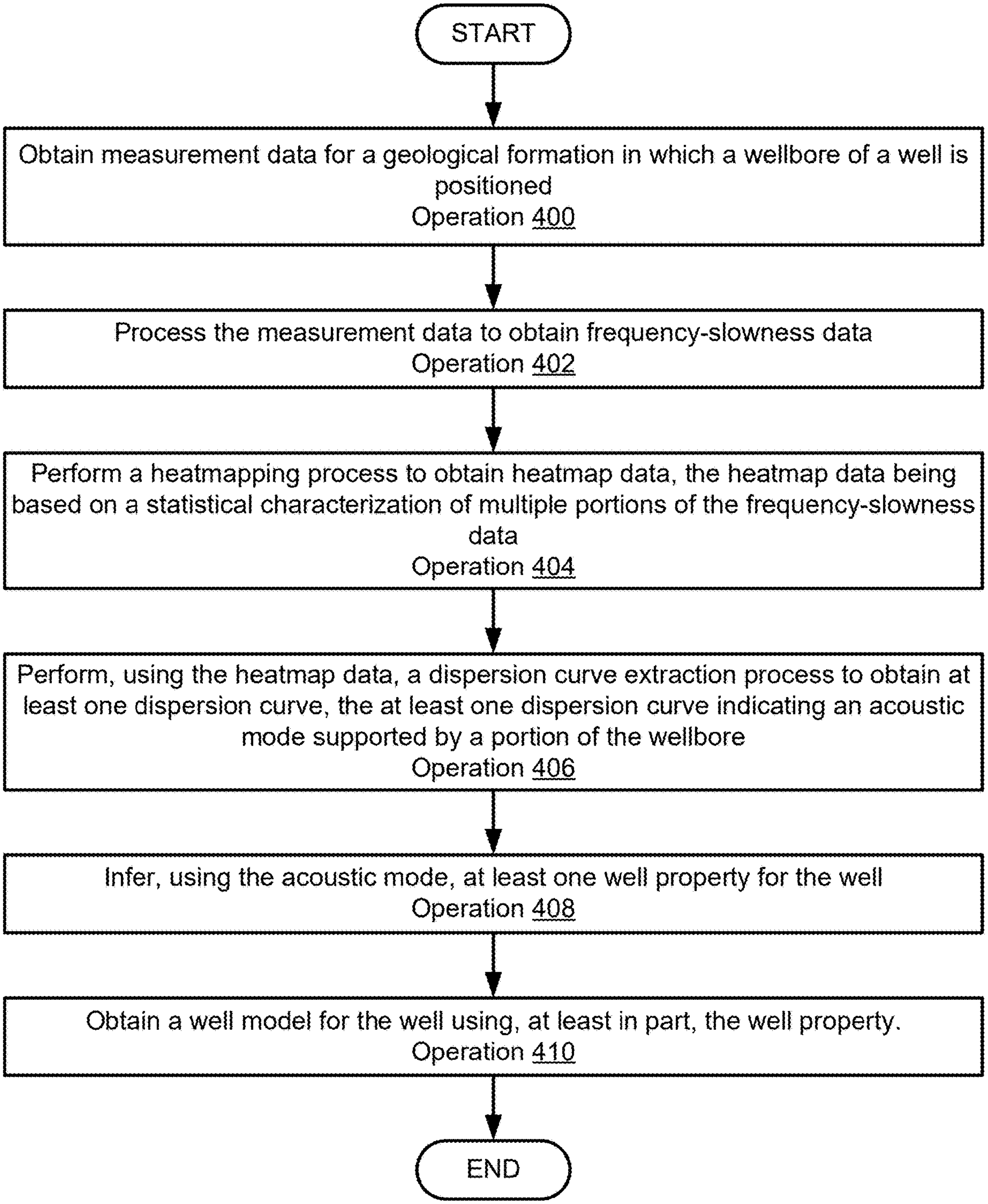
FIG. 4 shows a flow diagram illustrating a method in accordance with an embodiment.

Turning to FIG. 4, a flow diagram illustrating a method in accordance with an embodiment is shown. The flow diagram may illustrate various operations performed while managing completion of a well.

At operation 400, measurement data for a geological formation in which a wellbore of the well is positioned may be obtained. The measurement data may be obtained by obtaining sonic log data for the well. Obtaining the sonic log data for the well may include (i) reading the sonic log data from storage, (ii) receiving the sonic log data from another device, (iii) generating the sonic log data, and/or (iv) via other methods. For example, the sonic log data may be generated by running a sonic log tool in the wellbore at various depth intervals.

At operation 402, the measurement data may be processed to obtain frequency-slowness data. The measurement data may be processed by estimating dispersion of various acoustic modes supported by the various depth intervals and/or by running other algorithms used to process sonic data. For example, estimating the dispersion of various acoustic modes may include performing a TKO process that may generate frequency-slowness data from the measurement data.

At operation 404, a heatmapping process may be performed to obtain heatmap data. The heatmapping process may be performed by using any of the methods described with respect to FIGS. 2D-2E, and/or by other methods. As discussed with respect to FIGS. 2D-2E, the heatmap data may be based on a statistical characterization of multiple portions of the frequency-slowness data.

In a first example, performing the heatmapping process may include (i) performing a stacking process using at least a portion of the measurement data to obtain rough heatmap data, and (ii) performing a filtering process on the rough heatmap data to obtain the heatmap data.

Performing the stacking process may include (i) establishing a grid definition for the rough heatmap data, and (ii) combining the portion of the measurement data based on the grid definition to obtain the rough heatmap data. The grid definition may be established by (i) obtaining input from a subject matter expert, (ii) basing the grid definition parameters on a sample rate of the measurement data, (iii) obtaining the grid definition from another source (e.g., from storage, from similar previously performed processes), and/or (iv) other methods. The portion of the measurement data may be combined by aggregating (e.g., using a function, such as a stack function) the portion of the measurement data in accordance with the grid definition to obtain rough heatmap data. For example, data points of the portion of the measurement data falling within defined cells of the grid may be summed and/or normalized based on the stacking function in order to obtain the rough heatmap data.

Performing the filtering process on the rough heatmap data may include applying at least one filtering algorithm to increase a signal to noise ratio of the rough heatmap data to obtain the heatmap data. The filtering algorithm may be applied, for example, by (i) ingesting the rough heatmap data into a filtering process (e.g., filtering process 210 of FIG. 2D), (ii) parameterizing the filtering process (e.g., by a subject matter expert) to reduce noise and preserve signal in the rough heatmap data, (iii) treating the output from the filtering process as the heatmap data, and/or (iv) other methods.

In a second example, performing the heatmapping process may include (i) generating, using at least a portion of the measurement data and a kernel-based heatmap generation algorithm, a plurality of heatmap data candidates, and (ii) selecting the heatmap data from the plurality of heatmap data candidates.

The plurality of heatmap data candidates may be generated, for example, by (i) providing, by a subject matter expert, a set of parameters for the kernel-based heatmap generation algorithm, (ii) providing the at least a portion of the measurement data for ingestion by the kernel-based heatmap generation algorithm, (iii) treating the output as the plurality of heatmap data candidates, and/or (iv) other methods. The plurality of heatmap data candidates may be associated with a plurality of statistical metrics output from the kernel-based heatmap generation algorithm.

The heatmap data may be selected from the plurality of heatmap data candidates by (i) visually inspecting each of the heatmap data candidates (e.g., displaying the heatmap data candidates as a frequency-slowness heatmap plot of amplitude values) to identify levels of continuity of acoustic mode signal and levels of noise and/or artifacts, (ii) analyzing the plurality of statistical metrics to identify minimum or maximums of the statistical metrics, and/or (iii) selecting the heatmap data based on the continuity levels, the signal levels, the noise levels, the minimum and/or the maximum statistical metrics, etc.

In a third example, performing the heatmapping process may include (i) performing a stacking process using at least a portion of the measurement data to obtain stacked frequency-slowness data, and (ii) using a kernel-based heatmap generation algorithm to generate the heatmap data based on the stacked frequency-slowness data. The stacking process to obtain the stacked frequency-slowness data may be performed using methods similar to those discussed with respect to the first example and/or by other methods. The kernel-based heatmap generation algorithm may ingest the stacked frequency-slowness data in order to generate heatmap data using methods similar to those discussed with respect to the second example and/or by other methods.

At operation 406, a dispersion curve extraction process may be performed to obtain at least one dispersion curve. The dispersion curve extraction process may be performed by using any of the methods described with respect to FIGS. 2D-2E, and/or by other methods.

In a first example, the dispersion curve extraction process may be performed by (i) performing a binarization process on the heatmap data to obtain binarized heatmap data, (ii) performing a region selection process based on the binarized heatmap data and a calibration curve to identify a subset of the heatmap data, and (iii) performing a measurement data calibration process using the subset of the heatmap data to obtain the at least one dispersion curve.

The binarization process may be performed by, for example, (i) providing, by a subject matter expert and/or via an automated analysis of portions of the heatmap data, a set of parameters (e.g., thresholds) for the binarization process, (ii) providing the at least a portion of the heatmap data for ingestion by the binarization process, (iii) treating the output of the binarization process as the binarized heatmap data, and/or (iv) other methods.

Performing the region selection process may include (i) obtaining a mask for the heatmap data using the calibration curve and the binarized heatmap data, and (ii) applying the mask to the heatmap data to obtain the subset of the heatmap data. The calibration curve may be based on a presumed topology of the wellbore and/or may represent an expected response of an acoustic mode in the wellbore. The calibration curve may be obtained from a template library (e.g., a template repository) of modeled calibration curves based on properties of the wellbore.

The mask may be obtained by overlaying the calibration curve on the binarized heatmap data to determine which regions should be selected. For example, the binarized heatmap data may include a plurality of regions, and only regions of the plurality of regions that the calibration curve intersects (e.g., within a tolerance) may be included in the selected regions. In other words, the mask may be based on only a portion of the plurality of regions (e.g., those indicated by the calibration curve). The mask may include zero values (e.g., outside of the selected regions) and non-zero values (e.g., inside of the selected regions).

The mask may be applied to the heatmap data using methods discussed with respect to FIG. 2D, and/or by other methods. For example, applying the mask to the heatmap data may include multiplying values of the mask with corresponding values of the heatmap data (e.g., zeroing portions of the heatmap data values outside of the selected regions) to obtain the subset of the heatmap data corresponding to the selected regions.

Performing the measurement data calibration process may include obtaining a best fit curve to the subset of the heatmap data. The best fit curve may be obtained by the methods discussed with respect to FIG. 2D and/or by other methods. For example, the best fit curve may be obtained by (i) providing the subset of the heatmap data as a series of data points to a curve fitting process, and (ii) treating the output of the curve fitting process as the best fit curve. For example, the curve fitting process may include interpolation, smoothing, skeletonization of the heatmap data, regression analysis, etc.

The measurement data calibration process may also include visual verification of the best fit curve by a subject matter expert. For example, the best fit curve may be modified (e.g., extrapolated) in order to obtain the at least one dispersion curve. The at least one dispersion curve may include an absence of any dispersion curve (e.g., non-existence of an acoustic mode and/or so attenuated that it is indistinguishable in measurements).

In a second example, performing the dispersion curve extraction process may include (i) identifying a plurality of calibration curve sets based on a presumed topology of the wellbore, and (ii) performing a measurement data calibration process using the plurality of calibration curve sets and the heatmap data to obtain the at least one dispersion curve. For example, the plurality of calibration curve sets may be identified using a set of wellbore parameters (e.g., based on the presumed topology of the wellbore) to query a template library of calibration curve sets. The plurality of calibration curve sets may be read from the template library (e.g., a template repository) to perform the measurement data calibration process.

Performing the measurement data calibration process may include (i) analyzing alignment of the plurality of calibration curve sets with the heatmap data to identify a best calibration curve set, (ii) modifying, based on the heatmap data, the best calibration curve set to obtain a modified best calibration curve set, and (iii) using a portion of the modified best calibration curve set as the at least one dispersion curve.

The alignment of the plurality of calibration curve sets may be analyzed by visual inspection (e.g., by a subject matter expert), by an automated process, and/or using statistical characterizations of portions of the heatmap data defined by the calibration curves of the calibration curve sets. For example, the best calibration curve set may be identified as the calibration curve set that includes a calibration curve that best aligns with a specific acoustic mode indicated by the heatmap data. Or, for example, if an expected acoustic mode is not indicated by the heatmap data, the plurality of calibration curve sets may indicate an unexpected well condition (e.g., a well property).

The best calibration curve set may be modified by extrapolation, smoothing, translation, and/or other transform functions, in order to improve alignment of one or more calibration curves of the set with one or more acoustic modes. A portion of the modified best calibration curve set may be used as the at least one dispersion curve. For example, a single calibration curve (e.g., corresponding to a specific acoustic mode) may be selected from the best calibration curve set and may be used as the at least one dispersion curve.

At operation 408, at least one well property for the well may be inferred using the acoustic mode. The well property may be inferred by analyzing the at least one dispersion curve (e.g., with respect to other modeled dispersion curves) to obtain information regarding the wellbore such as cement quality, and/or information regarding the geological formation surrounding the wellbore such as shear anisotropy or other rock properties usable for geological modeling. For example, the at least one dispersion curve (e.g., including an absence of a dispersion curve) may have dependence on the structure of the well, materials in the well, properties of the geological formation, and/or other aspects of the well. This dependence may be used to deduce these other properties based on the at least one dispersion curve.

At operation 410, a well model for the well may be obtained using, at least in part, the well property. The well model may be obtained by performing a modeling process using the well property (e.g., derived from the dispersion curve) and/or other data. Refer to the discussion of FIG. 2B for more information regarding obtaining the well model.

A well completion plan may be obtained using, at least, the well model. The well completion plan may be obtained by (i) reading the well completion plan from storage, (ii) receiving the well completion plan from another device, (iii) generating the well completion plan, and/or (iv) via other methods.

The well completion plan may be obtained by providing the well model to a planning system. An operator of the planning system may use the well model to complete the well completion plan. For example, a subject matter expert, another person, or an automated system may use the well model to identify portions of the well for hydrocarbon exploitation. The identified portions may be used to define workflows (e.g., actions) to complete the well such that the portions of the well are used for the eventual exploitation of hydrocarbons. For example, various portions of the well may be designated for perforating.

The well may be completed using the well completion plan to obtain a completed well. The well may be completed by performing any of the actions/workflows specified by the well completion plan. For example, various actions may be performed to install completion components in the well. The location and type of the completion components may be based on the well model.

An energy product may be obtained using hydrocarbons produced from the completed well. The energy product may be obtained by pumping fluid into and/or extracting fluid from the geological formation using the well.

The method may end following operation 410.

Thus, as illustrated above, embodiments disclosed herein may provide systems and methods usable to manage completion of a well by improving the quality and/or accuracy of conditioned measurement data that may influence the determination of well completion plans.

Figure 5:
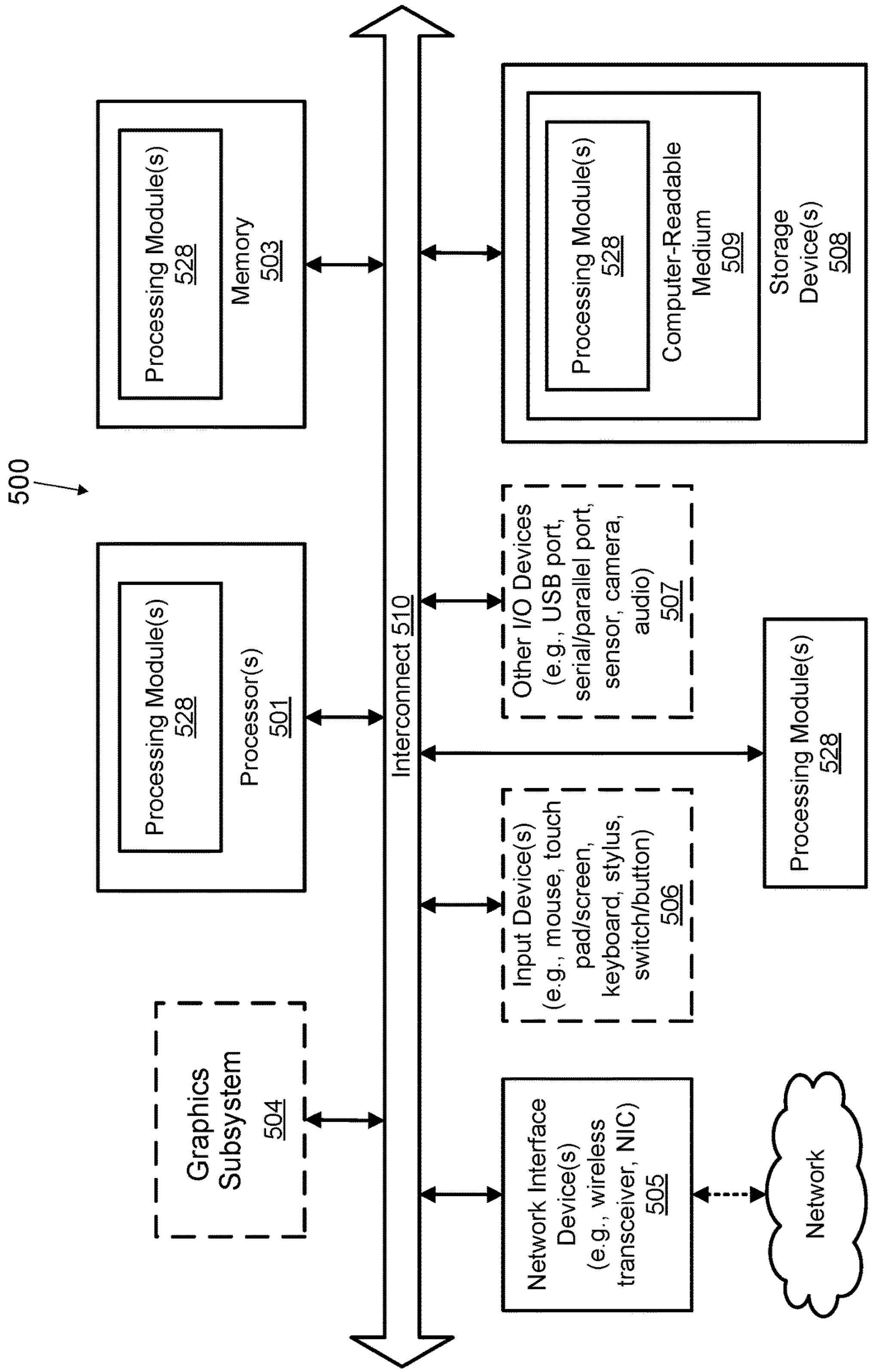
FIG. 5 shows a block diagram illustrating a data processing system in accordance with an embodiment.

Any of the components illustrated in FIGS. 1A-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In an embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in an embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charge coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In an embodiment, to enable a thinner and lighter system design as well as to improve system responsiveness, this mass storage may be implemented via a solid-state device (SSD). In an embodiment, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing completion of a well, the method comprising:

obtaining measurement data for a geological formation in which a wellbore of the well is positioned;

processing the measurement data to obtain frequency-slowness data;

performing a heatmapping process to obtain heatmap data, the heatmap data being based on a statistical characterization of multiple portions of the frequency-slowness data;

performing, using the heatmap data, a dispersion curve extraction process to obtain at least one dispersion curve, the at least one dispersion curve indicating an acoustic mode supported by a portion of the wellbore, the performing the dispersion curve extraction process comprising:

performing a binarization process on the heatmap data to obtain binarized heatmap data;

performing a region selection process based on the binarized heatmap data and a calibration curve to identify a subset of the heatmap data, the calibration curve being selected from a template repository based on a presumed topology of the wellbore;

obtaining a mask for the heatmap data using the calibration curve and the binarized heatmap data;

applying the mask to the heatmap data to obtain the subset of the heatmap data; and performing a measurement data calibration process using the subset of the heatmap data to obtain the at least one dispersion curve, the measurement data calibration process comprising obtaining a best fit curve to the subset of the heatmap data, the at least one dispersion curve being based on the best fit curve;

inferring, using the acoustic mode, at least one well property for the well;

obtaining a well model for the well using, at least in part, the well property;

obtaining a well completion plan using the well model;

completing the well using the well completion plan by installing one or more completion components along the wellbore in locations indicated by the well completion plan; and obtaining an energy product using the completed well.

2. The method of claim 1, wherein the performing the heatmapping process comprises:

performing a stacking process using at least a portion of the measurement data to obtain rough heatmap data; and performing a filtering process on the rough heatmap data to obtain the heatmap data.

3. The method of claim 2, wherein the performing the stacking process comprises:

establishing a grid definition for the rough heatmap data; and combining the portion of the measurement data based on the grid definition to obtain the rough heatmap data.

4. The method of claim 3, wherein the performing the filtering process comprises applying at least one filtering algorithm to increase a signal to noise ratio of the rough heatmap data to obtain the heatmap data.

5. The method of claim 1, wherein the performing the heatmapping process comprises:

generating, using at least a portion of the measurement data and a kernel-based heatmap generation algorithm, a plurality of heatmap data candidates, the plurality of heatmap data candidates being associated with a plurality of statistical metrics; and selecting, based on the plurality of statistical metrics, the heatmap data from the plurality of heatmap data candidates.

6. The method of claim 1, wherein the performing the dispersion curve extraction process further comprises:

identifying a plurality of calibration curve sets based on a presumed topology of the wellbore; and performing a measurement data calibration process using the plurality of calibration curve sets and the heatmap data to obtain the at least one dispersion curve.

7. The method of claim 6, wherein the performing the measurement data calibration process comprises:

analyzing alignment of the plurality of calibration curve sets with the heatmap data to identify a best calibration curve set;

modifying, based on the heatmap data, the best calibration curve set to obtain a modified best calibration curve set; and using a portion of the modified best calibration curve set as the at least one dispersion curve.

8. The method of claim 1, wherein the performing the heatmapping process comprises:

performing a stacking process using at least a portion of the measurement data to obtain stacked frequency-slowness data; and using a kernel-based heatmap generation algorithm to generate the heatmap data based on the stacked frequency-slowness data.

9. A non-transitory machine-readable medium having instructions stored therein, which when executed by one or more processors, cause the one or more processors to perform operations for managing completion of a well, the operations comprising:

obtaining measurement data for a geological formation in which a wellbore of the well is positioned;

processing the measurement data to obtain frequency-slowness data;

performing a heatmapping process to obtain heatmap data, the heatmap data being based on a statistical characterization of multiple portions of the frequency-slowness data;

performing, using the heatmap data, a dispersion curve extraction process to obtain at least one dispersion curve, the at least one dispersion curve indicating an acoustic mode supported by a portion of the wellbore, the performing the dispersion curve extraction process comprising:

performing a binarization process on the heatmap data to obtain binarized heatmap data;

performing a region selection process based on the binarized heatmap data and a calibration curve to identify a subset of the heatmap data, the calibration curve being selected from a template repository based on a presumed topology of the wellbore;

obtaining a mask for the heatmap data using the calibration curve and the binarized heatmap data;

applying the mask to the heatmap data to obtain the subset of the heatmap data; and performing a measurement data calibration process using the subset of the heatmap data to obtain the at least one dispersion curve, the measurement data calibration process comprising obtaining a best fit curve to the subset of the heatmap data, the at least one dispersion curve being based on the best fit curve;

inferring, using the acoustic mode, at least one well property for the well;

obtaining a well model for the well using, at least in part, the well property;

obtaining a well completion plan using the well model;

completing the well using the well completion plan by installing one or more completion components along the wellbore in locations indicated by the well completion plan; and obtaining an energy product using the completed well.

10. The non-transitory machine-readable medium of claim 9, wherein the performing the heatmapping process comprises:

performing a stacking process using at least a portion of the measurement data to obtain rough heatmap data; and performing a filtering process on the rough heatmap data to obtain the heatmap data.

11. The non-transitory machine-readable medium of claim 10, wherein the performing the stacking process comprises:

establishing a grid definition for the rough heatmap data; and combining the portion of the measurement data based on the grid definition to obtain the rough heatmap data.

12. A data processing system, comprising:

one or more processors; and a memory coupled to the one or more processors to store instructions, which when executed by the one or more processors, cause the one or more processors to perform operations for managing completion of a well, the operations comprising:

obtaining measurement data for a geological formation in which a wellbore of the well is positioned;

processing the measurement data to obtain frequency-slowness data;

performing a heatmapping process to obtain heatmap data, the heatmap data being based on a statistical characterization of multiple portions of the frequency-slowness data;

performing, using the heatmap data, a dispersion curve extraction process to obtain at least one dispersion curve, the at least one dispersion curve indicating an acoustic mode supported by a portion of the wellbore, the performing the dispersion curve extraction process comprising:

performing a binarization process on the heatmap data to obtain binarized heatmap data;

performing a region selection process based on the binarized heatmap data and a calibration curve to identify a subset of the heatmap data, the calibration curve being selected from a template repository based on a presumed topology of the wellbore;

obtaining a mask for the heatmap data using the calibration curve and the binarized heatmap data;

applying the mask to the heatmap data to obtain the subset of the heatmap data; and performing a measurement data calibration process using the subset of the heatmap data to obtain the at least one dispersion curve, the measurement data calibration process comprising obtaining a best fit curve to the subset of the heatmap data, the at least one dispersion curve being based on the best fit curve;

inferring, using the acoustic mode, at least one well property for the well;

obtaining a well model for the well using, at least in part, the well property;

obtaining a well completion plan using the well model;

completing the well using the well completion plan by installing one or more completion components along the wellbore in locations indicated by the well completion plan; and obtaining an energy product using the completed well.

13. The data processing system of claim 12, wherein the performing the heatmapping process comprises:

performing a stacking process using at least a portion of the measurement data to obtain rough heatmap data; and performing a filtering process on the rough heatmap data to obtain the heatmap data.

14. The data processing system of claim 13, wherein the performing the stacking process comprises:

establishing a grid definition for the rough heatmap data; and combining the portion of the measurement data based on the grid definition to obtain the rough heatmap data.

15. The method of claim 1, wherein the performing the measurement data calibration process further comprises applying a skeletonization procedure to the subset of the heatmap data prior to obtaining the at least one dispersion curve.

* * * * *